United States Patent
Mouazen

(10) Patent No.: US 11,242,287 B2
(45) Date of Patent: Feb. 8, 2022

(54) BITUMEN WHICH IS SOLID AT AMBIENT TEMPERATURE

(71) Applicant: TOTAL MARKETING SERVICES, Puteaux (FR)

(72) Inventor: Mouhamad Mouazen, Nanterre (FR)

(73) Assignee: TOTAL MARKETING SERVICES, Puteaux (FR)

( * ) Notice: Subject to any disclaimer, the term of this patent is extended or adjusted under 35 U.S.C. 154(b) by 175 days.

(21) Appl. No.: 16/331,958

(22) PCT Filed: Sep. 5, 2017

(86) PCT No.: PCT/FR2017/052348
§ 371 (c)(1),
(2) Date: Mar. 8, 2019

(87) PCT Pub. No.: WO2018/046839
PCT Pub. Date: Mar. 15, 2018

(65) Prior Publication Data
US 2019/0248705 A1 Aug. 15, 2019

(30) Foreign Application Priority Data
Sep. 8, 2016 (FR) ..................................... 1658337

(51) Int. Cl.
| | |
|---|---|
| C04B 26/26 | (2006.01) |
| C04B 24/04 | (2006.01) |
| C04B 40/00 | (2006.01) |
| C10C 3/00 | (2006.01) |
| C08L 95/00 | (2006.01) |
| C08K 3/36 | (2006.01) |
| C08L 91/08 | (2006.01) |

(52) U.S. Cl.
CPC .............. *C04B 26/26* (2013.01); *C04B 24/04* (2013.01); *C04B 40/0042* (2013.01); *C08K 3/36* (2013.01); *C08L 91/08* (2013.01); *C08L 95/00* (2013.01); *C10C 3/00* (2013.01); C08K 2201/005 (2013.01); C08K 2201/006 (2013.01); C08L 2207/53 (2013.01); C08L 2555/22 (2013.01); C08L 2555/24 (2013.01)

(58) Field of Classification Search
CPC .......... C04B 24/04; C04B 26/26; C08K 3/36; C08L 95/00; C10C 3/00
See application file for complete search history.

(56) References Cited

U.S. PATENT DOCUMENTS

| | | | |
|---|---|---|---|
| 3,026,568 A | 3/1962 | Moar | |
| 4,279,579 A | 7/1981 | Froeschke | |
| 5,880,185 A | 3/1999 | Planche et al. | |
| 7,918,930 B2 * | 4/2011 | Lapalu | C10C 3/026 |
| | | | 106/273.1 |
| 2008/0021147 A1 * | 1/2008 | Lin | C09C 1/309 |
| | | | 524/493 |
| 2010/0056669 A1 * | 3/2010 | Bailey | B29B 9/16 |
| | | | 523/201 |
| 2012/0123028 A1 | 5/2012 | Dreesen et al. | |
| 2013/0041075 A1 * | 2/2013 | Harders | C08K 5/20 |
| | | | 524/68 |
| 2015/0291798 A1 | 10/2015 | Sautel et al. | |
| 2015/0307713 A1 | 10/2015 | Krafft et al. | |
| 2017/0226320 A1 | 8/2017 | Mariotti et al. | |
| 2017/0356136 A1 * | 12/2017 | Kriech | E01C 7/187 |

FOREIGN PATENT DOCUMENTS

| | | |
|---|---|---|
| EP | 0 199 475 A1 | 10/1986 |
| WO | 02/31083 A2 | 4/2002 |
| WO | 03/012008 A2 | 2/2003 |
| WO | 2004/020532 A1 | 3/2004 |
| WO | 2007/058994 A2 | 5/2007 |
| WO | 2007/128636 A2 | 11/2007 |
| WO | 2008/022836 A1 | 2/2008 |
| WO | 2008/043635 A1 | 4/2008 |
| WO | 2008/137394 A1 | 11/2008 |
| WO | 2008/141930 A1 | 11/2008 |
| WO | 2008/141932 A1 | 11/2008 |
| WO | 2009/015969 A1 | 2/2009 |
| WO | 2009/071467 A1 | 6/2009 |
| WO | 2009/153324 A1 | 12/2009 |
| WO | 2010/028261 A2 | 3/2010 |
| WO | 2011/000133 A1 | 1/2011 |
| WO | 2012/168380 A1 | 12/2012 |

OTHER PUBLICATIONS

Amiri et al. Colloids and Surfaces A: Physicochem. Eng. Aspects, (2009), p. 43-54.*
Dec. 15, 2017 Search Report issued in International Patent Application No. PCT/FR2017/052348.
Mar. 12, 2019 International Preliminary Search Report issued in International Patent Application No. PCT/FR2017/052348.
Brunauer, Stephen et al., "Adsorption of Gases in Multimolecular Layers", J. Am. Chemical Society, 60: 1938, pp. 309-319.

* cited by examiner

*Primary Examiner* — Yong L Chu
(74) *Attorney, Agent, or Firm* — Oliff PLC

(57) ABSTRACT

Bitumen pellets including a core and a coating layer, in which: the core includes at least one bitumen base, and the coating layer includes at least one fumed silica compound. Process for manufacturing bitumen pellets and also their use as road binder, in particular for the manufacture of bitumen mixes. Process for manufacturing bitumen mixes from bitumen pellets and also a process for transporting and/or storing and/or handling bitumen pellets.

20 Claims, No Drawings

BITUMEN WHICH IS SOLID AT AMBIENT TEMPERATURE

TECHNICAL FIELD

The present invention relates to bitumen pellets which are solid at ambient temperature, in particular at elevated ambient temperature. The present invention also relates to a process for preparing these pellets, and also to the use thereof as road binder, in particular for the manufacture of bitumen mixes.

The present invention also relates to a process for manufacturing bitumen mixes from the bitumen pellets according to the invention and also to a process for transporting and/or storing and/or handling these bitumen pellets at ambient temperature, in particular at elevated ambient temperature.

PRIOR ART

Bitumen is used in the vast majority in construction, mainly in the manufacture of roadways or in industry, for example for roofing applications. It is generally in the form of a black material that is highly viscous, or even solid, at ambient temperature and which liquefies on heating.

In general, bitumen is stored and transported hot, in bulk, in tank trucks or by boat at high temperatures of the order of 120° C. to 160° C. However, the storage and transportation of hot bitumen presents certain drawbacks. First, the transportation of hot bitumen in liquid form is considered hazardous and is governed by very strict regulations. This mode of transportation does not present any particular difficulties when the transportation equipment and infrastructures are in good condition. When such is not the case, it may become problematic: if the tank truck is not sufficiently thermally insulated, the viscosity of the bitumen may increase during an excessively long journey. Bitumen delivery distances are therefore limited. Secondly, maintaining bitumen at high temperatures in tanks or in tank trucks consumes energy. In addition, maintaining bitumen at high temperatures for a long period may affect the properties of the bitumen and thus change the final performance qualities of the bitumen mix.

To overcome the problems of transporting and storing hot bitumen, conditionings enabling the transportation and storage of bitumens at ambient temperature have been developed. This mode of transporting bitumen in conditioning at ambient temperature represents only a tiny fraction of the amounts transported worldwide, but it meets very real needs for geographical regions that are difficult and expensive to access via conventional transportation means.

An example that may be mentioned of conditioning for cold transportation that is currently used is the conditioning of bitumen at ambient temperature in metal drums. This means is increasingly coming under question from an environmental viewpoint since the bitumen stored in the drums must be heated before its use as road binder. However, this operation is difficult to perform for this type of conditioning, and the drums constitute waste after use. Moreover, the storage of bitumen at ambient temperature in drums leads to losses since bitumen is very viscous and part of the product remains on the walls of the drum during transfer into the tanks of the bitumen-mix production units. As regards the manipulation and transportation of bituminous products in these drums, they may prove to be difficult and hazardous if the specialized equipment for handling drums is not available to transporters or at the site of use of the bitumen.

Other examples of conditioning that may be mentioned include bitumens in the form of pellets transported and/or stored in bags, which are often used in places where the ambient temperature is high. These pellets have the advantage of being easy to handle. U.S. Pat. No. 3,026,568 describes bitumen pellets covered with a powdery material, such as limestone powder. However, this type of granular bitumen does not prevent the bitumen from undergoing creep, especially at elevated ambient temperature.

Patent application WO 2009/153324 describes bitumen pellets coated with a polymeric anticaking compound, in particular polyethylene. The drawback of this coating is that it modifies the properties of the bitumen during its road application.

Patent application WO 2016/016318 describes bitumen pellets comprising a chemical additive. These bitumen pellets allow the transportation and/or storage and/or handling of the bitumen at ambient temperature without the bitumen undergoing creep, and also the reduction in their adhesion and agglomeration together.

In the continuation of its work, the Applicant discovered, surprisingly, a novel bitumen pellet composition which makes it possible to avoid and to reduce adhesion and agglomeration during the transportation and/or storage and/or handling of bitumen, at elevated ambient temperature, over long periods, and for which the properties of the bitumen are conserved over time relative to the pellets of the prior art.

More precisely, the Applicant demonstrated that this novel bitumen pellet composition makes it possible to withstand creep under extreme transportation and/or storage and/or handling conditions, under compression conditions, in particular due to storage, over very long periods.

SUMMARY OF THE INVENTION

One subject of the invention is bitumen pellets comprising a core and a coating layer, in which:
   the core comprises at least one bitumen base, and
   the coating layer comprises at least one fumed silica compound.

The invention also relates to a process for manufacturing bitumen pellets composed of a core and a layer coating the core, this process comprising:
   i) forming of the core from at least one bitumen base,
   ii) dusting or coating of the core over all or part of its surface, respectively, with a fumed silica compound or with a composition comprising at least one fumed silica compound,
   iii) optionally, drying of the pellets obtained in step ii) at a temperature ranging from 20 to 60° C., for a period ranging from 5 minutes to 5 hours, preferably from 5 minutes to 2 hours.

The invention also relates to the bitumen pellets that may be obtained by performing this process.

According to one embodiment of the invention, the fumed silica compound has a specific surface area of between 25 and 420 $m^2/g$, preferentially between 90 and 330 $m^2/g$, more preferentially between 120 and 280 $m^2/g$.

According to one embodiment of the invention, the fumed silica compound has a mean particle size of between 5 and 50 nm.

According to one embodiment of the invention, the fumed silica compound has a pH of between 3 and 10, when it is in the aqueous phase.

According to one embodiment of the invention, the fumed silica compound has a carbon content of between 0.1% and 10% by weight, relative to the total weight of the fumed silica compound.

According to one embodiment of the invention, the fumed silica compound is a fumed silica.

According to one embodiment of the invention, the fumed silica compound is chosen from a hydrophilic fumed silica compound, a hydrophobic fumed silica compound, and mixtures thereof.

Preferably, the fumed silica compound is a hydrophilic fumed silica compound.

According to one embodiment of the invention, the coating layer may also comprise at least one anticaking compound.

Preferably, the anticaking compound is chosen from: talc; fines generally with a diameter of less than 125 μm, such as siliceous fines, with the exception of limestone fines; sand such as Fontainebleau sand; cement; carbon; wood residues such as lignin, lignosulfonate, conifer needle powders, conifer cone powders, especially of pine; rice husk ash; glass powder; clays such as kaolin, bentonite or vermiculite; alumina such as alumina hydrates; silica; silica derivatives such as silicates, silicon hydroxides and silicon oxides; plastic powder; lime; plaster; rubber powder; polymer powder, where the polymers are such as styrene-butadiene (SB) copolymers or styrene-butadiene-styrene (SBS) copolymers; and mixtures thereof.

According to one embodiment of the invention, the bitumen base has a needle penetrability measured at 25° C. according to the standard EN 1426 of from 5 to 330 $\frac{1}{10}$ mm, preferably from 20 to 220 $\frac{1}{10}$ mm.

According to one embodiment of the invention, the bitumen base also comprises at least one chemical additive chosen from: an organic compound, a paraffin, a polyphosphoric acid, and mixtures thereof.

According to one embodiment of the invention, the bitumen base has a penetrability of from 5 to 45 $\frac{1}{10}$ mm, measured at 25° C. according to the standard EN 1426 and/or a ring and ball softening point of greater than or equal to 90° C., the ring and ball softening point being measured according to the standard EN 1427.

According to a preferred embodiment, the bitumen pellets show stability on transportation and/or storage and/or handling at a temperature ranging up to 100° C., advantageously from 20° C. to 90° C., preferably from 20° C. to 80° C., more preferentially from 40° C. to 80° C., even more preferentially from 40° C. to 60° C., for a period of greater than or equal to 2 months, preferably greater than or equal to 3 months.

The invention also relates to the use of the bitumen pellets defined above as road binder.

According to a preferred embodiment, the use relates to the manufacture of bitumen mixes.

The invention also relates to a process for manufacturing bitumen mixes comprising at least one road binder and aggregates, the road binder being chosen from the bitumen pellets defined above, this process comprising at least the steps of:
  heating the aggregates to a temperature ranging from 100° C. to 180° C., preferably from 120° C. to 160° C.,
  mixing the aggregates with the road binder in a tank such as a mixer or a mixing drum,
  obtaining bitumen mixes.

According to a preferred embodiment, the process for manufacturing bitumen mixes does not include a step of heating the road binder before it is mixed with the aggregates.

Finally, the invention relates to a process for transporting and/or storing and/or handling road bitumen, said road bitumen being transported and/or stored and/or handled in the form of bitumen pellets as defined above.

DETAILED DESCRIPTION

The objectives that the Applicant set itself have been achieved by means of the development of bitumen compositions in a divided form, having a core/envelope structure, in which the core is based on bitumen and the coating layer gives the overall structure improved properties under extreme transportation and/or storage and/or handling conditions relative to the bitumen pellets known in the prior art.

A first subject of the invention relates to bitumen pellets comprising a core and a coating layer, in which:
  the core comprises at least one bitumen base, and
  the coating layer comprises at least one fumed silica compound.

The term "elevated ambient temperature" means the temperature resulting from the climatic conditions under which the road bitumen is transported and/or stored and/or handled. More precisely, elevated ambient temperature is equivalent to the temperature reached during the transportation and/or storage of road bitumen, which is less than 100° C. Advantageously, the elevated ambient temperature is from 20° C. to 90° C., preferably from 20° C. to 80° C., more preferentially from 40° C. to 80° C. and even more preferentially from 40° C. to 60° C., it being understood that elevated ambient temperature implies that no heat is supplied other than that resulting from the climatic conditions.

The term "extreme conditions" refers to the conditions for transporting and/or storing and/or handling road bitumen with a road bitumen transportation and/or storage and/or handling temperature ranging up to 100° C., advantageously from 20° C. to 90° C., preferably from 20° C. to 80° C., more preferentially from 40° C. to 80° C. and even more preferentially from 40° C. to 60° C.

The invention relates to bitumens that may be solid when they are subjected to elevated ambient temperatures, in particular a temperature ranging up to 100° C., advantageously from 20° C. to 90° C., preferably from 20° C. to 80° C., more preferentially from 40° C. to 80° C. and even more preferentially from 40° C. to 60° C.

The term "bitumen which is solid at elevated ambient temperature" means a bitumen which has a solid appearance at elevated ambient temperature under the transportation and/or storage and/or handling conditions. More precisely, the term "bitumen which is solid at elevated ambient temperature" means a bitumen which conserves its solid appearance throughout the transportation and/or storage and/or handling at elevated ambient temperature, i.e. a bitumen which does not creep at a temperature ranging up to 100° C., advantageously from 20° C. to 90° C., preferably from 20° C. to 80° C., more preferentially from 40° C. to 80° C. and even more preferentially from 40° C. to 60° C., under its own weight and, furthermore, which does not creep when it is subjected to a temperature ranging up to 100° C., advantageously from 20° C. to 90° C., preferably from 20° C. to 80° C., more preferentially from 40° C. to 80° C. and even more preferentially from 40° C. to 60° C., and to pressure forces derived from the transportation and/or storage and/or handling conditions.

The term "coating layer covering all or part of the surface of the core" means that the coating layer covers at least 90% of the surface of the core, preferably at least 95% of the surface of the core and more preferentially at least 99% of the surface of the core.

The term "consists essentially of" followed by one or more features means that, besides the components or steps specifically listed, components or steps which do not significantly modify the properties and features of the invention may be included in the process or the material of the invention.

The expression "between X and Y" includes the limits. This expression thus means that the targeted range comprises the values X, Y and all the values ranging from X to Y.

The Fumed Silica Compound

The term "fumed silica compound" means either a fumed silica or a fumed silica derivative.

The term "fumed silica" means a compound obtained by the vapor-phase hydrolysis of chlorosilanes, such as silicon tetrachloride, in a flame of oxygen and hydrogen. Such processes are generally denoted as pyrogenic processes, the overall reaction of which is: $SiCl_4+H_2+O_2 \rightarrow SiO_2+4HCl$.

For the purposes of the invention, "fumed silica" and "pyrogenic silica" compounds have the same chemical definition and are recorded under the same number CAS 112 945-52-5. Consequently, for the purposes of the invention, these compounds may be employed without discrimination between them.

Fumed silicas are distinguished from the other silicon dioxides in that they have an amorphous structure. These silicas, of high purity (>99.8% silica), have a weak hydrophilic nature (no microporosity).

Preferably, the fumed silica compound is fumed silica.

According to one embodiment of the invention, the fumed silica compound has a specific surface area of between 25 and 420 $m^2/g$, preferentially between 90 and 330 $m^2/g$, more preferentially between 120 and 280 $m^2/g$.

The specific surface area of the fumed silica, defined in $m^2/g$, commonly known as the "surface area" or "SA", is measured according to the method of S. Brunauer, P. H. Emmett and I. Teller, J. Am. Chemical Society, 60: 309 (1938) (BET).

According to one embodiment of the invention, the fumed silica compound has a mean particle size of between 5 and 50 nm.

According to one embodiment of the invention, the fumed silica compound has a pH of between 3 and 10, when it is in the aqueous phase.

According to one embodiment of the invention, the fumed silica compound has a carbon content of between 0.1% and 10% by weight, relative to the total weight of the fumed silica compound.

According to one embodiment of the invention, the fumed silica compound is chosen from a hydrophilic fumed silica compound, a hydrophobic fumed silica compound, and mixtures thereof.

Preferably, the fumed silica compound is a hydrophilic fumed silica compound.

The term "hydrophilic" refers to a compound which is miscible with water in all proportions.

The fumed silica compound, or fumed silica derivative, used within the meaning of the invention may be chemically modified.

Various types of fumed silica compounds are described in the following patent applications and can be used in the present invention:
  silanized fumed silicas, as described in WO 2004/020532 or in WO 2007/128636,
  hydrophilic fumed silicas, as described in WO 2009/071467 and WO 2011/000133, filed in the name of Degussa AG or Degussa GmbH,
  fumed silicas rendered hydrophobic by a treatment using polysiloxanes, as described in WO 2008/141932, or by silanization, as described in WO 2008/141930,
  silicas doped with potassium oxide, as described in WO 2008/043635 and WO 2008/022836,
  silicas in the form of aggregates of primary particles, as described in WO 2009/015969, filed in the name of Evonik Degussa GmbH, or in WO 2010/028261, filed in the name of Cabot Corporation.

The fumed silica compound may be used alone or as a mixture in a coating composition.

Whether it is used alone or as a mixture in a composition, the fumed silica compound may be used in the process for producing coated pellets in the form of a powder or as a dispersion in a solvent which evaporates after application.

Preferably, when the composition comprises at least one fumed silica compound and at least one solvent, the composition comprises from 5% to 70% by weight of fumed silica compound, relative to the total weight of the composition, more preferentially from 20% to 40% by weight.

Preferably, the solvent is an organic solvent or water. The term "organic solvent" means any solvent which is immiscible with a bitumen, such as an alcohol, for example ethanol.

The fumed silica compounds used in the invention are commercially available and may be sold, for example, by Evonik Degussa under the brand name Aerosil®, for instance Aerosil® 200, by Cabot Corporation under the brand names Cab-O-Sil® and Cab-O-Sperse® or by Wacker Chemie AG under the brand name HDK®.

According to one embodiment of the invention, the mass of the fumed silica compound covering at least part of the surface of the pellets is between 0.2% and 10% by mass, preferably between 0.5% and 8% by mass, more preferentially between 0.5% and 5% relative to the total mass of bitumen of said pellets.

The bitumen pellets are covered with the fumed silica compound according to any known process, for example according to the process described in U.S. Pat. No. 3,026,568.

According to one embodiment of the invention, the core of the pellets also comprises at least one fumed silica compound as defined above.

Preferably, the core of the bitumen pellets also comprises between 0.5% and 20% by mass, preferably between 2% and 20% by mass, more preferentially between 4% and 15% by mass, of the fumed silica compound relative to the total mass of bitumen of the core of said pellets.

In this embodiment, the core of the bitumen pellets is prepared from road bitumen, said road bitumen being prepared by placing in contact:
  one or more bitumen bases,
  between 0.1% and 5% by mass, preferably between 0.5% and 4% by mass, more preferentially between 0.5% and 2.8% by mass, and even more preferentially between 0.5% and 2.5% by mass of a chemical additive(s) relative to the total mass of bitumen of the core of said pellets, and
  between 0.5% and 20% by mass, preferably between 2% and 20% by mass, more preferentially between 4% and 15% by mass of fumed silica compound relative to the total mass of bitumen of the core of said pellets.

The Other Anticaking Compounds

When they are present, the other anticaking compounds are of mineral or organic origin. The term "anticaking agent"

or "anticaking compound" means any compound which limits, reduces, inhibits or delays the agglomeration and/or adhesion of the pellets together during their transportation and/or storage at elevated ambient temperature and which ensures their fluidity during handling.

More preferentially, the anticaking compound is chosen from: talc; fines, also known as fillers, generally with a diameter of less than 125 µm, such as siliceous fines, with the exception of limestone fines; sand, such as Fontainebleau sand; cement; carbon; wood residues, such as lignin, lignosulfonate, conifer needle powders or conifer cone powders, in particular of pine; rice husk ash; glass powder; clays, such as kaolin, bentonite or vermiculite; alumina, such as alumina hydrates; silica; silica derivatives, such as silicates, silicon hydroxides and other silicon oxides; plastic powder; lime; plaster; rubber powder; polymer powder, where the polymers are such as styrene/butadiene (SB) copolymers or styrene/butadiene/styrene (SBS) copolymers, and mixtures of these materials.

Advantageously, the anticaking compound is chosen from: fines, generally with a diameter of less than 125 µm; wood residues, such as lignin, conifer needle powders and conifer cone powders; mixtures thereof.

The bitumen pellets are covered with the anticaking compound according to any known process, for example according to the process described in U.S. Pat. No. 3,026,568.

The Coating Layer

According to one embodiment of the invention, the coating layer is obtained by dusting the bitumen core with at least one fumed silica compound over all or part of the surface of the bitumen core.

According to an alternative embodiment of the invention, the coating layer is obtained by applying a composition comprising at least one fumed silica compound and at least one solvent over all or part of the surface of the core of the bitumen core.

In this embodiment, the coating layer is solid at elevated ambient temperature, in particular at a temperature above 60° C.

According to one embodiment of the invention, the average thickness of the coating layer is preferably greater than or equal to 20 µm, more preferentially between 20 and 100 µm. The coating layer must be thick enough for it to be continuous.

Besides the fumed silica compound, the coating layer may optionally comprise one or more compounds chosen from: chemical additives, polymers, etc.

According to a preferred embodiment, the coating layer consists essentially of the fumed silica compound.

According to a preferred embodiment, the coating layer consists essentially of fumed silica.

The Pellets

For the purposes of the invention, the term "bitumen pellets" may also be defined as a bitumen that is solid at ambient temperature, conditioned in a divided form, i.e. in the form of small-sized units, referred to as pellets or particles, including a bitumen-based core and an envelope or shell or covering or coating layer or coating.

Preferably, the bitumen pellets according to the invention may have, within the same population of pellets, one or more shapes chosen from a cylindrical, spherical or ovoid shape. The size of the bitumen pellets is such that the longest mean dimension is preferably less than or equal to 50 mm, more preferentially from 3 to 30 mm and even more preferentially from 5 to 20 mm. The size and shape of the bitumen pellets may vary according to the manufacturing process employed. For example, the use of a die makes it possible to control the manufacture of pellets of a chosen size. A sieving makes it possible to select pellets according to their size.

Preferably, the bitumen pellets according to the invention have a weight of between 0.1 g and 50 g, preferably between 0.2 g and 10 g and more preferentially between 0.2 g and 5 g.

Without being bound to the theory, the Applicant has discovered, unexpectedly, that the use of a fumed silica compound according to the invention makes it possible to obtain a coating layer:
  which is resistant to extreme climatic conditions and to the extreme transportation and/or storage conditions of the solid road bitumen,
  which breaks easily under the effect of mechanical shear, for instance under the effect of mechanical shear applied in a tank such as a mixer or a mixing drum during the manufacture of bitumen mixes.

More particularly, the coating layer withstands the transportation and/or storage of the bitumen at elevated ambient temperature, in particular at a temperature above 60° C., in "big bags" while at the same time being brittle under the effect of mechanical shear. It thus allows the release of the bitumen core during the manufacture of bitumen mixes.

According to one embodiment of the invention, the bitumen pellets may also comprise one or more other coating layers, based on a fumed silica compound and optionally one or more other anticaking agents covering all or part of the coating layer of the bitumen solid according to the invention.

The Bitumen Base

Advantageously, the nucleus or core of the solid bitumen pellets according to the invention is prepared from road bitumen, said road bitumen being prepared by placing in contact:
  one or more bitumen bases, and
  optionally at least one chemical additive.

For the purposes of the invention, the terms "bitumen" and "road bitumen" are used equivalently and independently of each other. The term "bitumen" or "road bitumen" means any bituminous composition constituted by one or more bitumen bases and optionally comprising one or more chemical additives, said compositions being intended for a road application.

Among the bitumen bases that may be used according to the invention, mention may be made first of bitumens of natural origin, those contained in deposits of natural bitumen, of natural asphalt or bituminous sands and bitumens originating from the refining of crude oil. The bitumen bases according to the invention are advantageously chosen from bitumen bases originating from the refining of crude oil. The bitumen bases may be chosen from bitumen bases or mixtures of bitumen bases originating from the refining of crude oil, in particular bitumen bases containing asphaltenes or pitches. The bitumen bases may be obtained via conventional processes for manufacturing bitumen bases at a refinery, in particular by direct distillation and/or vacuum distillation of oil. These bitumen bases may optionally be viscosity-reduced and/or de-asphalted and/or air-rectified. It is common practice to perform vacuum distillation on the atmospheric residues originating from the atmospheric distillation of crude oil. This manufacturing process consequently corresponds to the sequence of atmospheric distillation and vacuum distillation, the feedstock feeding the vacuum distillation corresponding to the atmospheric residues. These vacuum residues derived from the vacuum distillation tower may also be used as bitumens. It is also common practice to inject air into a feedstock usually composed of distillates and of heavy products originating from the vacuum distillation of atmospheric residues originating from oil distillation. This process makes it possible to obtain a blown or semi-blown or air-oxidized or air-rectified or partially air-rectified base.

The various bitumen bases obtained via the refining processes may be combined together to obtain the best technical compromise. The bitumen base may also be a recycled bitumen base. The bitumen bases may be bitumen bases of hard grade or of soft grade.

According to the invention, for the conventional processes for manufacturing bitumen bases, the process is performed at manufacturing temperatures of between 100° C. and 200° C., preferably between 140° C. and 200° C., more preferentially between 140° C. and 170° C., and with stirring for a time of at least 10 minutes, preferably between 30 minutes and 10 hours, more preferentially between 1 hour and 6 hours. The term "manufacturing temperature" means the temperature of heating of the bitumen base(s) before mixing and also the mixing temperature. The heating time and temperature vary according to the amount of bitumen used and are defined by the standard NF EN 12594.

According to the invention, blown bitumens may be manufactured in a blowing unit, by passing a stream of air and/or oxygen through a starting bitumen base. This operation may be performed in the presence of an oxidation catalyst, for example phosphoric acid. The blowing is generally performed at high temperatures, of the order of 200 to 300° C., for relatively long times typically between 30 minutes and 2 hours, continuously or in batches. The blowing time and temperature are adjusted as a function of the properties targeted for the blown bitumen and as a function of the quality of the starting bitumen.

Preferentially, the bitumen base used for manufacturing the pellets of the invention, has a needle penetrability measured at 25° C. according to the standard EN 1426 of from 5 to 330 1/10 mm, preferably from 20 to 220 1/10 mm.

In a known manner, the "needle penetrability" measurement is performed by means of an NF EN 1426 standardized test at 25° C. ($P_{25}$). This penetrability characteristic is expressed in tenths of a millimeter (dmm or 1/10 mm). The needle penetrability, measured at 25° C. according to the standardized test NF EN 1426, represents the measurement of the penetration into a bitumen sample, after a time of 5 seconds, of a needle whose weight with its support is 100 g. The standard NF EN 1426 replaces the endorsed standard NFT 66-004 of December 1986 with effect from 20 Dec. 1999 (decision of the General Director of AFNOR dated 20 Nov. 1999).

The Chemical Additive

The bitumen base may also comprise at least one chemical additive chosen from: an organic compound, a paraffin, a polyphosphoric acid, and mixtures thereof.

In particular, when the solid bitumen comprises at least one chemical additive, the penetrability targeted for the supplemented bitumen base is preferably from 5 to 45 1/10 mm, and/or for the ring and ball softening point (RBSP) targeted is preferably greater than or equal to 90° C., it being understood that the penetrability is measured at 25° C. according to the standard EN 1426 and the RBSP is measured according to the standard EN 1427.

According to a first embodiment of the invention, the chemical additive is an organic compound. Advantageously, the organic compound has a molar mass of less than or equal to 2000 g·mol$^{-1}$, preferably a molar mass of less than or equal to 1000 g·mol$^{-1}$.

In this first embodiment, according to a first variant, the organic compound is a compound of general formula (I):

Ar1-R—Ar2     (I), in which:
  Ar1 and Ar2 represent, independently of each other, a benzene nucleus or a system of fused aromatic nuclei of 6 to 20 carbon atoms, substituted with at least one hydroxyl group, and
  R represents an optionally substituted divalent radical, the main chain of which comprises from 6 to 20 carbon atoms and at least one group chosen from amide, ester, hydrazide, urea, carbamate and anhydride functions.

Preferably, Ar1 and/or Ar2 are substituted with at least one alkyl group of 1 to 10 carbon atoms, advantageously in one or more ortho positions relative to the hydroxyl group(s); more preferentially, Ar1 and Ar2 are 3,5-dialkyl-4-hydroxyphenyl groups, advantageously 3,5-di-tert-butyl-4-hydroxyphenyl groups.

Preferably, R is in the para position relative to a hydroxyl group of Ar1 and/or Ar2.

Advantageously, the compound of formula (I) is 2',3-bis[(3-[3,5-di-tert-butyl-4-hydroxyphenyl]propionyl)]propionohydrazide.

According to a second variant of this first embodiment, the organic compound is a compound of general formula (II):

R—(NH)$_n$CONH—(X)$_m$—NHCO(NH)$_n$—R'     (II), in which:
  the groups R and R', which may be identical or different, contain a saturated or unsaturated, linear, branched or cyclic hydrocarbon-based chain, comprising from 1 to 22 carbon atoms, which is optionally substituted, and optionally comprising heteroatoms, rings and/or heterocycles;
  the group X contains a saturated or unsaturated, linear, cyclic or branched hydrocarbon-based chain, comprising from 1 to 22 carbon atoms, which is optionally substituted, and optionally comprising heteroatoms, rings and/or heterocycles;
  n and m are integers having a value of 0 or 1, independently of each other.

According to this variant, when the integer m has a value of 0, then the groups R—(NH)$_n$CONH and NHCO(NH)$_n$—R' are covalently bonded via a hydrazide bond CONH—NHCO. The group R, or the group R', then comprises at least one group chosen from: a hydrocarbon-based chain of at least 4 carbon atoms, an aliphatic ring of 3 to 8 atoms, an aliphatic, partially aromatic or totally aromatic fused polycyclic system, each ring comprising 5 or 6 atoms.

Still according to this variant, when the integer m has a value of 1, then the group R, the group R' and/or the group X comprises at least one group chosen from: a hydrocarbon-based chain of at least 4 carbon atoms, an aliphatic ring of 3 to 8 atoms, an aliphatic, partially aromatic or totally aromatic fused polycyclic system, each ring comprising 5 or 6 atoms.

Preferably, the group R and/or R' comprises an aliphatic hydrocarbon-based chain of 4 to 22 carbon atoms, chosen especially from $C_4H_9$, $C_5H_{11}$, $C_9H_{19}$, $C_{11}H_{23}$, $C_{12}H_{25}$, $C_{17}H_{35}$, $C_{18}H_{37}$, $C_{21}H_{43}$ and $C_{22}H_{45}$ groups.

Preferably, the group X represents a linear saturated hydrocarbon-based chain comprising from 1 to 22 carbon atoms. Preferably, the group X is chosen from $C_2H_4$ and $C_3H_6$ groups.

Preferably, the group X may also be a cyclohexyl group or a phenyl group, and the radicals R—$(NH)_n$CONH— and NHCO$(NH)_n$—R'— may then be in the ortho, meta or para position. Moreover, the radicals R—$(NH)_n$CONH— and NHCO$(NH)_n$—R'— may be in the cis or trans position relative to each other. Furthermore, when the radical X is cyclic, this ring may be substituted with groups other than the two main groups R—$(NH)_n$CONH— and —NHCO$(NH)_n$—R'.

Preferably, the group X comprises two rings of 6 carbons bonded via a $CH_2$ group, these rings being aliphatic or aromatic. In this case, the group X is a group including two aliphatic rings bonded via an optionally substituted $CH_2$ group, for instance:

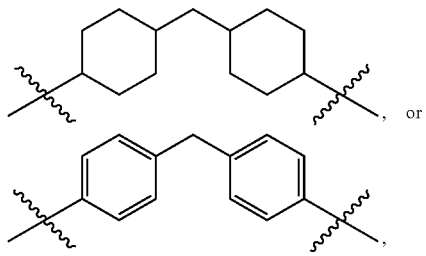, or

,

Advantageously, according to this variant, the organic compound is a compound of general formula (II) chosen from hydrazide derivatives such as the compounds $C_5H_{11}$—CONH—NHCO—$C_5H_{11}$, $C_9H_{19}$—CONH—NHCO—$C_9H_{19}$, $C_{11}H_{23}$—CONH—NHCO—$C_{11}H_{23}$, $C_{17}H_{35}$—CONH—NHCO—$C_{17}H_{35}$, or $C_{21}H_{43}$—CONH—NHCO—$C_{21}H_{43}$, diamides such as N,N'-ethylenedi(stearamide) of formula $C_{17}H_{35}$—CONH—$CH_2$—$CH_2$—NHCO—$C_{17}H_{35}$; and ureide derivatives such as 4,4'-bis(dodecylaminocarbonylamino)diphenylmethane of formula $C_{12}H_{25}$—NHCONH—$C_6H_4$—$CH_2$—$C_6H_4$—NHCONH—$C_{12}H_{25}$.

Preferably, the compound of general formula (II) is chosen from those which satisfy the condition n=0.

Preferably, the compound of general formula (II) is chosen from those which satisfy the condition: the sum of the numbers of carbon atoms of R, X and R' is greater than or equal to 10, advantageously greater than or equal to 14, preferably greater than or equal to 18.

Preferably, the compound of general formula (II) is chosen from those which satisfy the condition: the number of carbon atoms of at least one from among R and R' is greater than or equal to 10, advantageously greater than or equal to 12, preferably greater than or equal to 14.

Preferably, according to a first variant, the compound of general formula (II) is chosen from those of formula (IIA):

R—CONH—$(X)_m$—NHCO—R'  (IIA)

in which R, R', m and X have the same definition as above.

Preferably, in the formula (IIA), when m=1, the X group represents a saturated linear hydrocarbon-based chain comprising from 1 to 22 carbon atoms; advantageously, X represents a saturated linear hydrocarbon-based chain comprising from 1 to 12 carbon atoms and better still from 1 to 4 carbon atoms. Preferably, the X group is chosen from the $C_2H_4$ and $C_3H_6$ groups.

Preferably, the compound of general formula (IIA) is chosen from those which satisfy the condition: the sum of the numbers of carbon atoms of R, X and R' is greater than or equal to 10, advantageously greater than or equal to 14, preferably greater than or equal to 18.

Preferably, the compound of general formula (IIA) is chosen from those which satisfy the condition: the number of carbon atoms of at least one from among R and R' is greater than or equal to 10, advantageously greater than or equal to 12, preferably greater than or equal to 14.

More preferentially, according to this variant, the compound of general formula (IIA) is chosen from hydrazide derivatives, such as the compounds $C_5H_{11}$—CONH—NHCO—$C_5H_{11}$, $C_9H_{19}$—CONH—NHCO—$C_9H_{19}$, $C_{11}H_{23}$—CONH—NHCO—$C_{11}H_{23}$, $C_{17}H_{35}$—CONH—NHCO—$C_{17}H_{35}$ or $C_{21}H_{43}$—CONH—NHCO—$C_{21}H_{43}$; diamides, such as N,N'-ethylenedi(laurylamide) of formula $C_{ii}H_{23}$—CONH—$CH_2$—$CH_2$—NHCO—$C_{11}H_{23}$, N,N'-ethylenedi(myristylamide) of formula $C_{13}H_{27}$—CONH—$CH_2$—$CH_2$—NHCO—$C_{13}H_{27}$, N,N'-ethylenedi(palmitamide) of formula $C_{15}H_{31}$—CONH—$CH_2$—$CH_2$—NHCO—$C_{15}H_{31}$ or N,N'-ethylenedi(stearamide) of formula $C_{17}H_{35}$—CONH—$CH_2$—$CH_2$—NHCO—$C_{17}H_{35}$; monoamides, such as laurylamide of formula $C_{11}H_{23}$—$CONH_2$, myristylamide of formula $C_{13}H_{27}$—$CONH_2$, palmitamide of formula $C_{15}H_{31}$—$CONH_2$ or stearamide of formula $C_{17}H_{35}$—$CONH_2$.

Even more advantageously, the compound of general formula (IIA) is N,N'-ethylenedi(stearamide) of formula $C_{17}H_{35}$—CONH—$CH_2$—$CH_2$—NHCO—$C_{17}H_{35}$.

Preferably, according to a second variant, the compound of general formula (II) is chosen from those of formula (IIB):

R—CONH—R'  (IIB)

in which R and R' have the same definition as above.

Advantageously, according to this variant, the sum of the numbers of carbon atoms of R and R' is greater than or equal to 10, advantageously greater than or equal to 14, preferably greater than or equal to 18.

Even more advantageously, according to this variant, the number of carbon atoms of R is greater than or equal to 10, advantageously greater than or equal to 12, preferably greater than or equal to 14, and R'=H.

Advantageously, the compound of general formula (II) is chosen from hydrazide derivatives, such as the compounds $C_5H_{11}$—CONH—NHCO—$C_5H_{11}$, $C_9H_{19}$—CONH—NHCO—$C_9H_{19}$, $C_{11}H_{23}$—CONH—NHCO—$C_{11}H_{23}$, $C_{17}H_{35}$—CONH—NHCO—$C_{17}H_{35}$ or $C_{21}H_{43}$—CONH—NHCO—$C_{21}H_{43}$; diamides, such as N,N'-ethylenedi(laurylamide) of formula $C_{11}H_{23}$—CONH—$CH_2$—$CH_2$—NHCO—$C_{11}H_{23}$, N,N'-ethylenedi(myristylamide) of formula $C_{13}H_{27}$—CONH—$CH_2$—$CH_2$—NHCO—$C_{13}H_{27}$, N,N'-ethylenedi(palmitamide) of formula $C_{15}H_{31}$—CONH—$CH_2$—$CH_2$—NHCO—$C_{15}H_{31}$ or N,N'-ethylenedi(stearamide) of formula $C_{17}H_{35}$—CONH—$CH_2$—$CH_2$—NHCO—$C_{17}H_{35}$; monoamides, such as laurylamide of formula $C_{11}H_{23}$—$CONH_2$, myristylamide of formula $C_{13}H_{27}$—$CONH_2$, palmitamide of formula $C_{15}H_{31}$—$CONH_2$ or stearamide of formula $C_{17}H_{35}$—$CONH_2$.

Even more advantageously, the compound of general formula (II) is N,N'-ethylenedi(stearamide) of formula $C_{17}H_{35}$—CONH—$CH_2$—$CH_2$—NHCO—$C_{17}H_{35}$.

Preferably, when the chemical additive is chosen from the organic compounds of formula (II), it is used in combination with at least one other chemical additive chosen from the organic compounds of formulae (I), (III), (V), (VI) and (VII) and/or the reaction products of at least one C3-C12 polyol and of at least one C2-C12 aldehyde, in particular those comprising a group of formula (IV).

According to a third variant of this embodiment, the organic compound is a compound of formula (III):

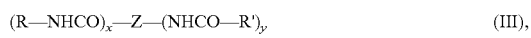

in which:
- R and R', which may be identical or different, contain a saturated or unsaturated, linear, branched or cyclic hydrocarbon-based chain, comprising from 1 to 22 carbon atoms, which is optionally substituted, and optionally comprising heteroatoms, rings and/or heterocycles,
- Z represents a trifunctionalized group chosen from the following groups:

$Z_1$
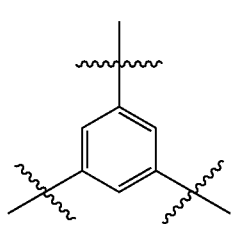

$Z_2$
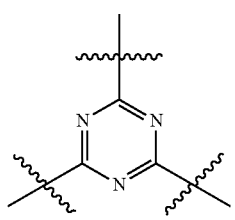

$Z_3$
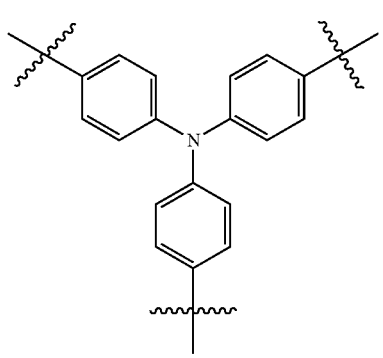

x and y are different integers with a value ranging from 0 to 3, and such that x+y=3.

Preferably, when x is equal to 0 and Z represents $Z_2$, the compound of formula (III) is N2,N4,N6-tridecylmelamine having the following formula with R' representing the $C_9H_{19}$ group:

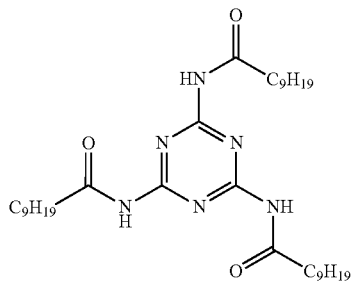

Other preferred compounds corresponding to formula (III) are such that x is equal to 0, Z represents $Z_2$ and R' represents a saturated linear hydrocarbon-based chain of 1 to 22 carbon atoms, preferably of 2 to 18 carbon atoms, preferably of 5 to 12 carbon atoms.

Other preferred compounds corresponding to formula (III) are such that: y is equal to 0 and Z represents $Z_1$, the compounds then having the formula:

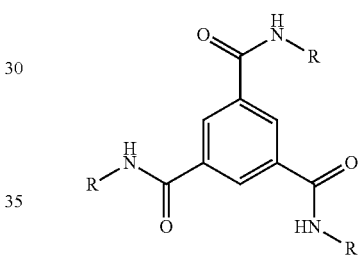

with R chosen from the following groups, taken alone or as mixtures:

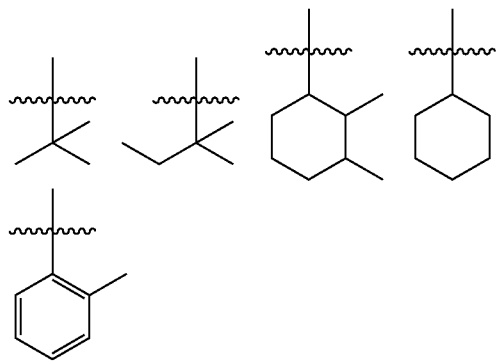

Other preferred compounds corresponding to formula (III) are such that: y is equal to 0, Z represents $Z_1$ and R represents a saturated linear hydrocarbon-based chain of 1 to 22 carbon atoms, preferably of 8 to 12 carbon atoms.

According to a fourth variant of this embodiment, the organic compound is a reaction product of at least one C3-C12 polyol and of at least one C2-C12 aldehyde. Among the polyols that may be used, mention may be made of sorbitol, xylitol, mannitol and/or ribitol. Preferably, the polyol is sorbitol.

Advantageously, according to this variant, the organic compound is a compound which comprises at least one function of general formula (IV):

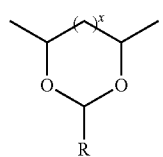

(IV)

in which:
x is an integer,
R is chosen from a C1-C11 alkyl, alkenyl, aryl or aralkyl radical, optionally substituted with one or more halogen atoms, one or more C1-C6 alkoxy groups.

The organic compound is advantageously a sorbitol derivative. The term "sorbitol derivative" means any reaction product obtained from sorbitol, in particular any reaction product obtained by reacting an aldehyde with D-sorbitol. Sorbitol acetals, which are sorbitol derivatives, are obtained via this condensation reaction. 1,3:2,4-Di-O-benzylidene-D-sorbitol is obtained by reacting 1 mol of D-sorbitol and 2 mol of benzaldehyde and has the formula:

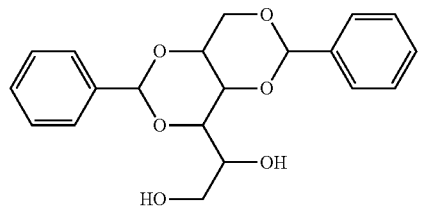 [SMILES: OCC(O)C1OC(c2ccccc2)OC2COC(c3ccccc3)OC21]

The sorbitol derivatives may thus all be condensation products of aldehydes, especially of aromatic aldehydes, with sorbitol. Sorbitol derivatives will then be obtained of general formula:

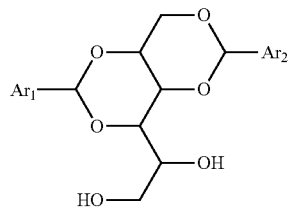

where Ar$_1$ and Ar$_2$ are optionally substituted aromatic nuclei.

The sorbitol derivatives, other than 1,3:2,4-di-O-benzylidene-D-sorbitol, can include, for example, 1,3:2,4:5,6-tri-O-benzylidene-D-sorbitol, 2,4-mono-O-benzylidene-D-sorbitol, 1,3:2,4-bis(p-methylbenzylidene)sorbitol, 1,3:2,4-bis(3,4-dimethylbenzylidene)sorbitol, 1,3:2,4-bis(p-ethylbenzylidene)sorbitol, 1,3:2,4-bis(p-propylbenzylidene) sorbitol, 1,3:2,4-bis(p-butylbenzylidene)sorbitol, 1,3:2,4-bis(p-ethoxylbenzylidene)sorbitol, 1,3:2,4-bis(p-chlorobenzylidene)sorbitol, 1,3:2,4-bis(p-bromobenzylidene)sorbitol, 1,3:2,4-di-O-methylbenzylidene-D-sorbitol, 1,3:2,4-di-O-dimethylbenzylidene-D-sorbitol, 1,3:2,4-di-O-(4-methylbenzylidene)-D-sorbitol and 1,3:2,4-di-O-(4,3-dimethylbenzylidene)-D-sorbitol. Preferably, according to this variant, the organic compound is 1,3:2,4-di-O-benzylidene-D-sorbitol.

According to a fifth variant of this embodiment, the organic compound is a compound of general formula (V):

$$R''-(COOH)_z \quad (V),$$

in which R" represents a linear or branched, saturated or unsaturated chain comprising from 4 to 68 carbon atoms, preferably from 4 to 54 carbon atoms, more preferentially from 4 to 36 carbon atoms and z is an integer ranging from 2 to 4.

Preferably, the group R" is preferably a saturated linear chain of formula $C_wH_{2w}$ with w being an integer ranging from 4 to 22, preferably from 4 to 12.

According to this variant of the invention, the organic compounds corresponding to formula (V) may be diacids (z=2), triacids (z=3) or tetracids (z=4). The preferred organic compounds according to this variant are diacids with z=2.

Preferably, according to this variant, the diacids have the general formula $HOOC-C_wH_{2w}-COOH$ with w being an integer ranging from 4 to 22, preferably from 4 to 12 and in which z=2 and $R''=C_wH_{2w}$.

Advantageously, according to this variant, the organic compound is a diacid chosen from adipic acid or 1,6-hexanedioic acid with w=4, pimelic acid or 1,7-heptanedioic acid with w=5, suberic acid or 1,8-octanedioic acid with w=6, azelaic acid or 1,9-nonanedioic acid with w=7, sebacic acid or 1,10-decanedioic acid with w=8, undecanedioic acid with w=9, 1,2-dodecanedioic acid with w=10 or tetradecanedioic acid with w=12.

The diacids may also be diacid dimers of unsaturated fatty acid(s), i.e. dimers formed from at least one unsaturated fatty acid, for example from a single unsaturated fatty acid or from two different unsaturated fatty acids. Diacid dimers of unsaturated fatty acid(s) are conventionally obtained by intermolecular dimerization reaction of at least one unsaturated fatty acid (for example Diels-Alder reaction). Preferably, only one type of unsaturated fatty acid is dimerized. They are derived in particular from the dimerization of an unsaturated fatty acid especially of $C_8$ to $C_{34}$, especially of $C_{12}$ to $C_{22}$, in particular of $C_{16}$ to $C_{20}$ and more particularly of $C_{18}$. A preferred fatty acid dimer is obtained by dimerization of linoleic acid, which may then be partially or totally hydrogenated. Another preferred fatty acid dimer has the formula $HOOC-(CH_2)_7-CH=CH-(CH_2)_7-COOH$. Another preferred fatty acid dimer is obtained by dimerization of methyl linoleate. Similarly, fatty acid triacids and fatty acid tetracids may be found, which are obtained, respectively, by trimerization and tetramerization of at least one fatty acid.

According to a sixth variant of this embodiment, the organic compound is a compound of general formula (VI):

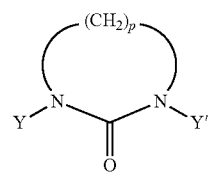

in which:
the groups Y and Y' represent, independently of each other, an atom or group chosen from: H, $-(CH_2)q-CH_3$, $-(CH_2)q-NH_2$, $-(CH_2)q-OH$, $-(CH_2)q-COOH$ or

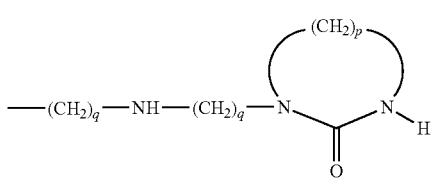

with q being an integer ranging from 2 to 18, preferably from 2 to 10, preferably from 2 to 4 and p being an integer greater than or equal to 2, preferably having a value of 2 or 3.

Among the preferred organic compounds corresponding to formula (VI), mention may be made of the following compounds:

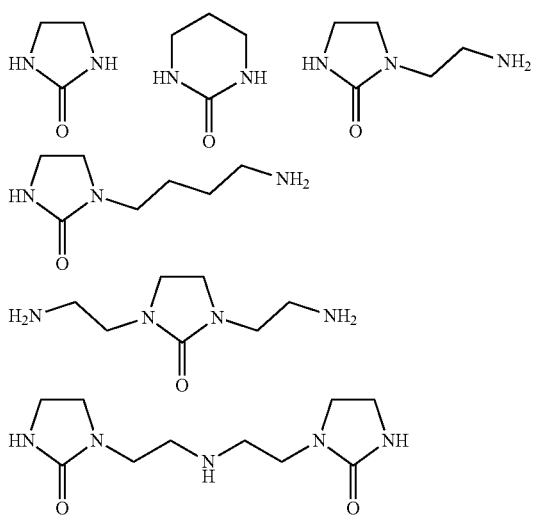

Preferably, according to this variant, the organic compound of general formula (VI) is:

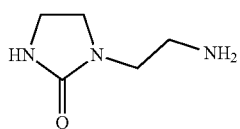

According to a seventh variant of this embodiment, the organic compound is a compound of general formula (VII):

R—NH—CO—CO—NH—R'  (VII)

in which R and R', which may be identical or different, represent a saturated or unsaturated, linear, branched or cyclic hydrocarbon-based chain, comprising from 1 to 22 carbon atoms, preferably from 8 to 12 carbon atoms, which is optionally substituted, and optionally comprising heteroatoms, rings and/or heterocycles.

According to another embodiment of the invention, the chemical additive is a paraffin. Paraffins have chain lengths of from 30 to 120 carbon atoms ($C_{30}$ to $C_{120}$). The paraffins are advantageously chosen from polyalkylenes. Preferably, use will be made according to the invention of polymethylene paraffins and polyethylene paraffins. These paraffins may be of petroleum origin or may originate from the chemical industry. Advantageously, the paraffins used are synthetic paraffins derived from the conversion of biomass and/or natural gas.

Preferably, these paraffins contain a large proportion of "normal" paraffins, i.e. linear, straight-chain, unbranched paraffins (saturated hydrocarbons). Thus, the paraffins may comprise from 50% to 100% of normal paraffins and from 0 to 50% of isoparaffins and/or of branched paraffins. More preferentially, the paraffins comprise from 85% to 95% of normal paraffins and from 5% to 15% of isoparaffins and/or of branched paraffins. Advantageously, the paraffins comprise from 50% to 100% of normal paraffins and from 0 to 50% of isoparaffins. Even more advantageously, the paraffins comprise from 85% to 95% of normal paraffins and from 5% to 15% of isoparaffins.

Preferably, the paraffins are polymethylene paraffins. More particularly, the paraffins are synthetic polymethylene paraffins, for example paraffins derived from the conversion of synthesis gas via the Fischer-Tropsch process. In the Fischer-Tropsch process, paraffins are obtained by reaction of hydrogen with carbon monoxide on a metal catalyst. Fischer-Tropsch synthetic processes are described, for example, in the publications EP 1 432 778, EP 1 328 607 or EP 0 199 475.

According to another embodiment of the invention, the chemical additive is a polyphosphoric acid. Polyphosphoric acids (PPA) that may be used in the invention are described in WO 97/14753. These are compounds of empirical formula PqHrOs in which q, r and s are positive numbers such that:

q≥2 and in particular q is from 3 to 20 or more and that 5q+r−2s=0.

In particular, said polyphosphoric acids may be linear compounds of empirical formula $P_qH_{(q+2)}O_{(3q+1)}$ corresponding to the structural formula:

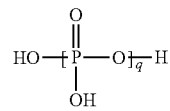

in which q has the definition given above. They may also be products of two-dimensional or three-dimensional structure.

All these polyphosphoric acids may be considered as products of polycondensation by heating aqueous metaphosphoric acid.

It would not constitute a departure from the scope of the invention to combine several different chemical additives such as different organic compounds of formulae (I), (II), (III), (V), (VI) and (VII), reaction products of at least one C3-C12 polyol and of at least one C2-C12 aldehyde, especially those comprising a group of formula (IV), and/or various paraffins and/or various polyphosphoric acids in the bitumen base.

According to one embodiment of the invention, the bitumen base of which the core of the pellets is composed comprises from 0.1% to 10% by mass, preferably from 0.5% to 5% by mass, more preferentially from 0.5% to 2.8% by mass and even more preferentially from 0.5% to 2.5% by mass of chemical additive relative to the total mass of said core.

According to one advantageous embodiment, the bitumen base comprises at least two chemical additives.

According to a first variant of this embodiment, the bitumen base comprises at least one first chemical additive of formula (V) and at least one second chemical additive chosen from: the chemical additives of formula (I); the chemical additives of formula (II); the chemical additives of formula (III); the chemical additives of formula (V); the chemical additives of formula (VI); the chemical additives of formula (VII) and the reaction products of at least one C3-C12 polyol and of at least one C2-C12 aldehyde, especially those comprising a group of formula (IV), the second chemical additive being different from the first chemical additive.

Preferably, and according to this first variant, the bitumen base comprises at least one first chemical additive of formula (V) and at least one second chemical additive of formula (II).

More preferentially, and according to this first variant, the bitumen base comprises at least one first additive of formula (V) and at least one second chemical additive of formula (IIA).

Preferably, and still according to this first variant, the first chemical additive of formula (V) is chosen from diacids (z=2), triacids (z=3) and tetracids (z=4), preferably from diacids (z=2).

More preferentially, and still according to this first variant, the first chemical additive of formula (V) is chosen from adipic acid or 1,6-hexanedioic acid with w=4, pimelic acid or 1,7-heptanedioic acid with w=5, suberic acid or 1,8-octanedioic acid with w=6, azelaic acid or 1,9-nonanedioic acid with w=7, sebacic acid or 1,10-decanedioic acid with w=8, undecanedioic acid with w=9, 1,2-dodecanedioic acid with w=10 or tetradecanedioic acid with w=12.

Advantageously, and according to this first variant, the first chemical additive of formula (V) is sebacic acid or 1,10-decanedioic acid with w=8.

According to a second variant of this embodiment, the bitumen base comprises at least one first chemical additive of formula (II) and at least one second chemical additive chosen from: the chemical additives of formula (I); the chemical additives of formula (II); the chemical additives of formula (III); the chemical additives of formula (V); the chemical additives of formula (VI); the chemical additives of formula (VII) and the reaction products of at least one C3-C12 polyol and of at least one C2-C12 aldehyde, especially those comprising a group of formula (IV), the second chemical additive being different from the first chemical additive.

Preferably, and according to this second variant, the first chemical additive of formula (II) is chosen from the chemical additives of formula (IIA).

More preferentially, and according to this second variant, the bitumen base comprises at least one first chemical additive of formula (IIA) and at least one second chemical additive chosen from: the chemical additives of formula (I); the chemical additives of formula (IIB); the chemical additives of formula (III); the chemical additives of formula (V); the chemical additives of formula (VI); the chemical additives of formula (VII) and the reaction products of at least one C3-C12 polyol and of at least one C2-C12 aldehyde, especially those comprising a group of formula (IV), the second chemical additive being different from the first chemical additive.

Even more preferentially, and according to this second variant, the bitumen base comprises at least one first additive of formula (IIA) and at least one second chemical additive of formula (V).

Advantageously, and according to this second variant, the first chemical additive of formula (II) is N,N'-ethylenedi(stearamide).

Preferably, and according to this second variant, the second chemical additive of formula (V) is chosen from adipic acid or 1,6-hexanedioic acid with w=4, pimelic acid or 1,7-heptanedioic acid with w=5, suberic acid or 1,8-octanedioic acid with w=6, azelaic acid or 1,9-nonanedioic acid with w=7, sebacic acid or 1,10-decanedioic acid with w=8, undecanedioic acid with w=9, 1,2-dodecanedioic acid with w=10 or tetradecanedioic acid with w=12.

According to a third preferred variant of this embodiment, the bitumen base comprises at least sebacic acid or 1,10-decanedioic acid and at least N,N'-ethylenedi(stearamide).

According to a fourth variant of this embodiment, the bitumen base comprises at least one first additive of formula (I) and at least one second chemical additive chosen from: the chemical additives of formula (I); the chemical additives of formula (II); the chemical additives of formula (III); the chemical additives of formula (V); the chemical additives of formula (VI); the chemical additives of formula (VII) and the reaction products of at least one C3-C12 polyol and of at least one C2-C12 aldehyde, especially those comprising a group of formula (IV), the second chemical additive being different from the first chemical additive.

Preferably, and according to this fourth variant, the second chemical additive is chosen from the chemical additives of formula (II) and the chemical additives of formula (V).

Preferably, and according to this fourth variant, the second chemical additive of formula (II) is chosen from the chemical additives of formula (IIA).

More preferentially, and according to this fourth variant, the second chemical additive of formula (II) is N,N'-ethylenedi(stearamide).

Preferably, and still according to this fourth variant, the second chemical additive of formula (V) is chosen from diacids (z=2), triacids (z=3) and tetracids (z=4), preferably from diacids (z=2).

Even more preferentially, and still according to this fourth variant, the second chemical additive of formula (V) is chosen from adipic acid or 1,6-hexanedioic acid with w=4, pimelic acid or 1,7-heptanedioic acid with w=5, suberic acid or 1,8-octanedioic acid with w=6, azelaic acid or 1,9-nonanedioic acid with w=7, sebacic acid or 1,10-decanedioic acid with w=8, undecanedioic acid with w=9, 1,2-dodecanedioic acid with w=10 or tetradecanedioic acid with w=12.

Advantageously, and still according to this fourth variant, the second chemical additive of formula (V) is sebacic acid or 1,10-decanedioic acid.

Preferably, and according to this fourth variant, the first chemical additive of formula (I) is 2',3-bis[(3-[3,5-di(tert-butyl)-4-hydroxyphenyl]propionyl]propionohydrazide.

Preferably, and according to this embodiment, the mass ratio of the first chemical additive relative to the second chemical additive is from 1:99 to 99:1, preferably from 1:9 to 9:1, even more preferentially from 1:5 to 5:1.

According to one embodiment of the invention, the core may also comprise at least one olefinic polymer adjuvant.

The olefinic polymer adjuvant is preferably chosen from the group consisting of (a) ethylene/glycidyl (meth)acrylate copolymers; (b) ethylene/monomer A/monomer B terpolymers and (c) copolymers resulting from the grafting of a monomer B onto a polymer substrate.

(a) The ethylene/glycidyl (meth)acrylate copolymers are advantageously chosen from random or block, preferably random, copolymers of ethylene and of a monomer chosen from glycidyl acrylate and glycidyl methacrylate, comprising from 50% to 99.7% by mass, preferably from 60% to 95% by mass, more preferentially from 60% to 90% by mass, of ethylene.

(b) The terpolymers are advantageously chosen from random or block, preferably random, terpolymers of ethylene, of a monomer A and of a monomer B.

Monomer A is chosen from vinyl acetate and $C_1$ to $C_6$ alkyl acrylates or methacrylates.

Monomer B is chosen from glycidyl acrylate and glycidyl methacrylate. The ethylene/monomer A/monomer B terpolymers comprise from 0.5% to 40% by mass, preferably from 5% to 35% by mass and more preferentially from 10% to 30% by mass of units derived from monomer A, and from 0.5% to 15% by mass and preferably from 2.5% to 15% by mass of units derived from monomer B, the remainder being formed from units derived from ethylene.

(c) The copolymers result from the grafting of a monomer B chosen from glycidyl acrylate and glycidyl methacrylate onto a polymer substrate. The polymer substrate consists of a polymer chosen from polyethylenes, especially low-density polyethylenes, polypropylenes, random or block, preferably random, copolymers of ethylene and of vinyl acetate, and random or block, preferably random, copolymers of ethylene and of $C_1$ to $C_6$ alkyl acrylate or methacrylate, comprising from 40% to 99.7% by mass and preferably from 50% to 99% by mass of ethylene. Said grafted copolymers comprise from 0.5% to 15% by mass and preferably from 2.5% to 15% by mass of grafted units derived from monomer B.

Advantageously, the olefinic polymer adjuvant is chosen from random terpolymers of ethylene (b), of a monomer A chosen from $C_1$ to $C_6$ alkyl acrylates or methacrylates and of a monomer B chosen from glycidyl acrylate and glycidyl methacrylate, comprising from 0.5% to 40% by mass, preferably from 5% to 35% by mass and more preferentially from 10% to 30% by mass of units derived from monomer A, and from 0.5% to 15% by mass and preferably from 2.5% to 15% by mass of units derived from monomer B, the remainder being formed from units derived from ethylene.

According to one embodiment of the invention, the bitumen base of which the core of the pellets is composed comprises from 0.05% to 15% by mass, preferably from 0.1% to 10% by mass and more preferentially from 0.5% to 6% by mass of olefinic polymer adjuvant relative to the total mass of said core.

According to one embodiment of the invention, the core may also comprise other known additives or other known elastomers for bitumen, such as SB (copolymer comprising blocks of styrene and butadiene), SBS (styrene/butadiene/styrene block copolymer), SIS (styrene/isoprene/styrene), SBS* (styrene/butadiene/styrene star block copolymer), SBR (styrene-b-butadiene rubber) or EPDM (ethylene/propylene/diene-modified) copolymers. In addition, these elastomers can be crosslinked according to any known process, for example with sulfur. Mention may also be made of elastomers prepared from styrene monomers and butadiene monomers allowing crosslinking without a crosslinking agent, as described in WO 2007/058994 and WO 2008/137394 and by the Applicant in patent application WO 11/013073.

Process for Manufacturing the Pellets

Another subject of the invention relates to a process for manufacturing bitumen pellets composed of a core and a layer coating the core, this process comprising:

i) forming of the core from at least one bitumen base, ii) dusting or coating of the core over all or part of its surface, respectively, with a fumed silica compound or with a composition comprising at least one fumed silica compound and at least one solvent, iii) optionally, drying of the pellets obtained in step ii) at a temperature ranging from 20 to 60° C., for a period ranging from 5 minutes to 5 hours, preferably from 5 minutes to 2 hours.

Preferably, when step ii) is a dusting operation, it is performed by sprinkling or spraying.

Preferably also, when step ii) is a coating operation, it is performed by dipping, spraying, coextrusion, etc.

The forming of the core of the pellets from an optionally supplemented bitumen base may be performed according to any known process, for example according to the manufacturing process described in U.S. Pat. No. 3,026,568, WO 2009/153324 or WO 2012/168380. According to a particular embodiment, the forming of the solid bitumen core may be performed by draining, in particular with the aid of a drum.

Other techniques may be used in the process for manufacturing the solid bitumen core, in particular molding, pelletizing, extrusion, etc.

Preferably, the particles of solid bitumen core have a longest mean dimension ranging from 1 to 30 mm, advantageously from 5 to 20 mm.

Preferably, during the implementation of the process of the invention, the mass ratio of the coating layer relative to the mass of optionally supplemented bitumen base forming the core is from 0.1 to 1, advantageously from 0.2 to 0.9.

Another subject of the invention is bitumen pellets that may be obtained via the implementation of the process according to the invention as described above. Such bitumen pellets advantageously have the properties described above.

Uses of the Bitumen Pellets

Another subject of the invention also relates to the use of the bitumen pellets according to the invention as described above, as road binder.

The road binder can be employed to manufacture bitumen mixes, in combination with aggregates, according to any known process.

Preferably, the bitumen pellets according to the invention are used for the manufacture of bitumen mixes.

Bituminous surfacing mixes are used as materials for the construction and maintenance of road foundations and of their coating, and also for performing all roadway works. Examples that may be mentioned include surface dressings, hot bitumen mixes, cold bitumen mixes, cold cast bitumen mixes, emulsion gravels, base courses, tie coats, tack coats and wearing courses, and other combinations of a bituminous binder and of the road aggregate having particular properties, such as rutting-resistant courses, draining bitumen mixes, or asphalts (mixture between a bituminous binder and aggregates such as sand).

Another subject of the invention relates to a process for manufacturing bitumen mixes comprising at least one road binder and aggregates, the road binder being chosen from the bitumen pellets according to the invention, this process comprising at least the steps of:

heating the aggregates to a temperature ranging from 100° C. to 180° C., preferably from 120° C. to 160° C., mixing the aggregates with the road binder in a tank such as a mixer or a mixing drum, obtaining bitumen mixes.

The process of the invention has the advantage of being able to be performed without a preliminary step of heating the solid bitumen pellets.

The process for manufacturing bitumen mixes according to the invention does not require a step of heating of the bitumen pellets before mixing with the aggregates, since, on contact with the hot aggregates, the bitumen pellets melt.

The bitumen pellets according to the invention as described above have the advantage of being able to be added directly to the hot aggregates, without having to be melted prior to mixing with the hot aggregates.

Preferably, the step of mixing of the aggregates and of the road binder is performed with stirring, and stirring is then maintained for not more than 5 minutes, preferably not more than 1 minute to allow the production of a homogeneous mixture.

The bitumen pellets according to the present invention are noteworthy in that they allow the transportation and/or storage and/or handling of road bitumen at elevated ambient temperature under extreme conditions, in particular without there being agglomeration and/or adhesion of the solid bitumen during its transportation and/or storage and/or handling. Moreover, the coating layer of the pellets breaks under the effect of the contact with the hot aggregates and of shear, and it releases the bitumen base. Finally, the presence of the coating layer in the mixture of road binder and of aggregates does not degrade the properties of said road bitumen for a road application, when compared with an uncoated bitumen base.

Process for the Transportation and/or Storage and/or Handling of Road Bitumen

Another subject of the invention also relates to a process for transporting and/or storing and/or handling road bitumen, said road bitumen being transported and/or stored and/or handled in the form of bitumen pellets that are solid at elevated ambient temperature, especially at a temperature ranging up to 100° C., advantageously from 20° C. to 90° C., preferably from 20° C. to 80° C., more preferentially from 40° C. to 80° C. and even more preferentially from 40° C. to 60° C.

Preferably, the road bitumen is transported and/or stored and/or handled at an elevated ambient temperature for a period of more than or equal to 2 months, preferably 3 months.

Preferably, the elevated ambient temperature is a temperature ranging up to 100° C., advantageously from 20° C. to 90° C., preferably from 20° C. to 80° C., more preferentially from 40° C. to 80° C. and even more preferentially from 40° C. to 60° C.

The bitumen pellets according to the invention have the advantage of conserving their divided form, and thus of being able to be handled, after storage and/or transportation at elevated ambient temperature. They in particular have the capacity of flowing under their own weight without undergoing creep, which allows them to be stored conditioned in bags, drums or containers of any shape or volume, and then to be transferred from this conditioning into equipment, such as worksite equipment (tank, mixer, etc.).

The bitumen pellets are preferably transported and/or stored in bulk in 1 kg to 100 kg or 500 kg to 1000 kg bags, commonly known in the field of road bitumens as "big bags", said bags preferably being made of hot-melt material. They may also be transported and/or stored in bulk in 5 kg to 30 kg boxes or in 100 kg to 200 kg drums.

The various embodiments, variants, preferences and advantages described above for each of the subjects of the invention apply to all the subjects of the invention and may be taken separately or in combination.

The invention is illustrated by the following examples, which are given without any implied limitation.

EXAMPLES

Material and Methods

The rheological and mechanical features of the bitumens to which reference is made in these examples are measured in the manner indicated in table 1.

TABLE 1

| Property | Abbreviation | Unit | Measurement standard |
|---|---|---|---|
| Needle penetrability at 25° C. | $P_{25}$ | 1/10 mm | NF EN 1426 |
| Ring and ball softening point | RBSP | ° C. | NF EN 1427 |

The variation in ring and ball softening point (RBSP) is measured according to the standard NF EN 1427 of said composition between the sample extracted from the top part of the sample tube and the sample extracted from the bottom part of the sample tube.

Bitumen bases $B_2$ and $B_3$ are prepared using:

a bitumen base of 35/50 grade, denoted $B_1$, having a penetrability $P_{25}$ of 34 1/10 mm and an RBSP of 52.6° C. and commercially available from the Total group under the brand name Azalt®;

a styrene/butadiene/styrene (SBS) block copolymer, containing 30.5% by weight of styrene and 69.5% by weight of butadiene. The content of 1,2-vinyl groups is 27.8% by weight relative to the total weight of copolymer. The copolymer has a weight-average molecular mass (Mw) of 142 500 daltons and a polydispersity index PDI of 1.09. This copolymer is commercially available from the company Kraton under the name D1192;

1,10-decanedioic acid, denoted Additive A1;

flowers of sulfur, denoted crosslinking agent;

zinc octanoate, denoted scavenger.

The mass percentage amounts used for each bitumen are indicated in table 2 below.

TABLE 2

| Bitumen | $B_2$ | $B_3$ |
|---|---|---|
| Bitumen base $B_1$ | 98.5% | 94.8% |
| Additive A1 | 1.5% | 1.5% |
| SBS | — | 3.4% |
| Crosslinking agent | — | 0.1% |
| Scavenger | — | 0.2% |
| P25 (1/10 mm) | 14 | 21 |
| RBSP (° C.) | 93 | 37 |

The amount of additive for each bitumen is adjusted so as to obtain bitumens with equivalent mechanical properties, especially a similar penetrability $P_{25}$ and a similar RBSP.

The bitumens are prepared in the following manner:

For bitumen $B_2$, the bitumen base $B_1$ is introduced into a reactor maintained a 160° C. with stirring at 300 rpm for two hours. The acid is then introduced into the reactor. The contents of the reactor are maintained at 160° C. with stirring at 300 rpm for 1 hour.

For bitumen $B_3$, the bitumen base $B_1$ and the SBS copolymer are introduced into a reactor maintained at 185° C. and with stirring at 300 rpm. The contents of the reactor are then maintained at 185° C. with stirring at 300 rpm for 4 hours. 0.1% of crosslinking agent is added, the mixture is left to react for 2 hours at 185° C. with stirring at 300 rpm, and 0.2% of scavenger is added at 185° C. with stirring at 300 rpm for 20 min. The temperature is lowered to 160° C. with stirring at 300 rpm, and the acid is then added. The mixture is stirred for about 1 hour at 160° C. to obtain a homogeneous final appearance. The mixture is cooled to ambient temperature.

1. Preparation of the Bitumen Cores of the Solid Bitumen Pellets

The cores of the bitumen pellets $G_1$, $G_2$ and $G_3$ are prepared, respectively, from the bitumen bases $B_1$, $B_2$ and $B_3$ according to one of the following protocols.

1.1 General Method for Preparing the Bitumen Cores of the Pellets According to the Invention The bitumen base $B_1$, $B_2$ or $B_3$ is heated at 160° C. for two hours in an oven before being poured into a silicone mold having various spherical holes, so as to form the solid bitumen cores. After having observed the solidification of the bitumen in the mold, the surplus is leveled off using a blade heated with a Bunsen burner. After 30 minutes, the solid bitumen in the form of uncoated pellets is removed from the mold and stored in a tray covered with silicone paper. The bitumen cores are then allowed to cool to ambient temperature for 10 to 15 minutes.

1.2 General Method for Preparing the Bitumen Cores of the Pellets According to the Invention Via an Industrial Process For the implementation of this method, use may be made of a device and of a process as described in great detail in patent U.S. Pat. No. 4,279,579. Various models of this device are commercially available from the company Sandvik under the trade name Rotoform.

Bitumen pellets $G_1$, $G_2$ and $G_3$ may also be obtained from the bituminous composition $B_1$, $B_2$ or $B_3$ poured into the tank of such a device and maintained at a temperature of between 130 and 270° C.

One or more injection nozzles allow the transfer of the bitumen composition $B_1$, $B_2$ or $B_3$ inside the double pelletizing drum including an outer rotating drum, the two drums being equipped with slots, nozzles and orifices allowing the pelletizing of bitumen drops through the first stationary drum and orifices with a diameter of between 2 and 10 mm of the outer rotating drum. The bitumen drops are deposited on the upper face of a horizontal conveyor belt driven by rollers.

2. General Method for Preparing the Solid Bitumen Pellets According to the Invention Comprising a Coating Layer The bitumen pellets obtained according to methods 1.1 and 1.2 are left at ambient temperature for 10 to 15 minutes. The pellets thus formed are covered on their surface with an anticaking compound and then screened to remove the excess anticaking compound.

The bitumen pellets $G_1'$, comparative, and $G_2'$ and $G_3'$ according to the invention are prepared, respectively, from the bitumen pellets $G_1$, $G_2$ and $G_3$ according to the method described above, using fumed silica, commercially available under the reference Aerosil 200®, as anticaking compound.

The mass percentage of the coating for the pellets $G_1'$, $G_2'$ and $G_3'$ is about 1% by mass relative to the total mass of bitumen of the pellets.

3. Measurement of the Resistance to Storage of the Pellets

Test of Load Strength of the Pellets

This test is performed in order to evaluate the load strength of the bitumen pellets prepared above at a temperature of 65° C. under a compressive load. Specifically, this test makes it possible to simulate the temperature and compression conditions of the pellets on each other, to which they are subjected during transportation and/or storage in bulk in 10 to 100 kg bags or in 500 to 1000 kg big bags or in 200 kg drums, and to evaluate their strength under these conditions.

The load strength test is performed according to the following protocol: 5 mL of pellets are placed in a 20 mL syringe and the plunger is then placed on the pellets together with a mass of 208 g, representing a force applied as in a big bag. The whole is placed in an oven at 65° C. for at least 4 hours. The observations are collated in table 3 below.

TABLE 3

| Pellets | $G_1$ | $G_1'$ | $G_2$ | $G_2'$ | $G_3$ | $G_3'$ |
|---|---|---|---|---|---|---|
| Ambient temperature strength at 65° C. | -- | - | + | +++ | + | +++ |

+++: the pellets keep their initial shape and do not adhere together.
++: the pellets do not adhere together but are slightly deformed.
+: the pellets adhere together slightly.
−: the pellets are partially molten.
−−: the pellets are molten.

Pellets $G_2'$ and $G_3'$ according to the invention show very good strength at an ambient temperature of 65° C. insofar as they keep their initial shape and do not adhere together. Thus, the handling and transportation/storage of said pellets $G_2'$ and $G_3'$ will be easy insofar as the pellets do not melt and do not agglomerate together at elevated ambient temperature.

The invention claimed is:

1. A bitumen pellet comprising
a core and
a coating layer that covers at least a part of a surface of the core and comprises at least one fumed silica compound, a mass of the at least one fumed silica compound representing between 0.2% and 10% by mass relative to a total mass of bitumen of the bitumen pellets, wherein:
the core comprises
at least one bitumen base and
at least one chemical additive in an amount of between 0.1% and 5% by mass relative to a total mass of bitumen of the core, the at least one chemical additive being chosen from the group consisting of:
(a) a compound of general formula (I):

$$Ar1\text{-}R\text{—}Ar2 \qquad (I),$$

where:
Ar1 and Ar2 represent, independently of each other, a benzene nucleus or a system of fused aromatic nuclei of 6 to 20 carbon atoms, substituted with at least one hydroxyl group, and
R represents an optionally substituted divalent radical, the main chain of which comprises from 6 to 20 carbon atoms and at least one group chosen from amide, ester, hydrazide, urea, carbamate and anhydride functions;
(b) a compound of general formula (II):

$$R\text{—}(NH)_n CONH\text{—}(X)_m\text{—}NHCO(NH)_n\text{—}R' \qquad (II),$$

where:
the groups R and R', which are identical or different, contain a saturated or unsaturated, linear, branched or cyclic hydrocarbon-based chain, comprising from 1 to 22 carbon atoms, which is optionally substituted, and optionally comprising heteroatoms, rings and/or heterocycles,
the group X contains a saturated or unsaturated, linear, cyclic or branched hydrocarbon-based chain, comprising from 1 to 22 carbon atoms, which is optionally substituted, and optionally comprising heteroatoms, rings and/or heterocycles, and
n and m are integers having a value of 0 or 1, independently of each other; and
(c) a compound of general formula (V):

$$R''\text{—}(COOH)_z \qquad (V),$$

where:
R'' represents a linear or branched, saturated or unsaturated hydrocarbon-based chain comprising from 4 to 68 carbon atoms, and
z is an integer in a range of from 2 to 4.

2. The pellet as claimed in claim 1, wherein the at least one fumed silica compound has a specific surface area of between 25 and 420 m²/g.

3. The pellet as claimed in claim 2, wherein the at least one fumed silica compound has a specific surface area between 90 and 300 m²/g.

4. The pellet as claimed in claim 3, wherein the at least one fumed silica compound has a specific surface area between 120 and 280 m²/g.

5. The pellet as claimed in claim 1, wherein the at least one fumed silica compound has a mean particle size of between 5 and 50 nm.

6. The pellet as claimed in claim 1, wherein the at least one fumed silica compound has a carbon content of between 0.1% and 10% by weight, relative to a total weight of the at least one fumed silica compound.

7. The pellet as claimed in claim 1, wherein the at least one fumed silica compound is a fumed silica.

8. The pellet as claimed in claim 1, wherein the at least one fumed silica compound is a hydrophilic fumed silica compound, a hydrophobic fumed silica compound, or a mixture thereof.

9. The pellet as claimed in claim 8, wherein the at least one fumed silica compound is a hydrophilic fumed silica compound.

10. The pellet as claimed in claim 1, wherein the coating layer further comprises at least one other anticaking compound.

11. The pellet as claimed in claim 1, wherein the bitumen base has a needle penetrability measured at 25° C. according to standard EN 1426 of from 5 to 330 1/10 mm.

12. The pellet as claimed in claim 1, wherein the bitumen base has a needle penetrability measured at 25° C. according to standard EN 1426 of from 20 to 220 1/10 mm.

13. The pellet as claimed in claim 1, wherein the pellet is configured to show stability on transportation or storage or handling at a temperature that is in a range of up to 100° C. for a period of greater than or equal to 2 months.

14. The pellet as claimed in claim 13, wherein the pellet is configured to show stability on transportation or storage or handling at a temperature that is in a range of up to 100° C. for a period of greater than or equal to 3 months.

15. A process for manufacturing the bitumen pellet as claimed in claim 1, the process comprising:
i) forming the core from the at least one bitumen base,
ii) dusting or coating the core over all or part of its surface, with the at least one fumed silica compound or a composition comprising the at least one fumed silica compound and a solvent, and
iii) optionally, drying the pellet obtained in ii) at a temperature in a range of from 20 to 60° C., for a period in a range of from 5 minutes to 5 hours.

16. The pellet as claimed in claim 1, which is a road binder.

17. A process for manufacturing bitumen mixes comprising at least one road binder and aggregates, the at least one road binder being chosen from the bitumen pellet as claimed in claim 1, the process comprising:
heating the aggregates at a temperature ranging from 100° C. to 180° C.,
mixing the aggregates with the road binder in a tank, and obtaining the bitumen mixes.

18. The process as claimed in claim 17, wherein the process does not include heating the road binder before it is mixed with the aggregates.

19. The pellet as claimed in claim 7, wherein
the at least one additive is the compound of general formula (V),
R'' is a saturated linear chain of formula $C_w H_{2w}$ with w being an integer in a range of from 4 to 12, and
z is 2.

20. The pellet as claimed in claim 19, wherein the at least one additive is 1,10-decanedioic acid.

* * * * *